INVENTOR.
HARRY W. FAEBER

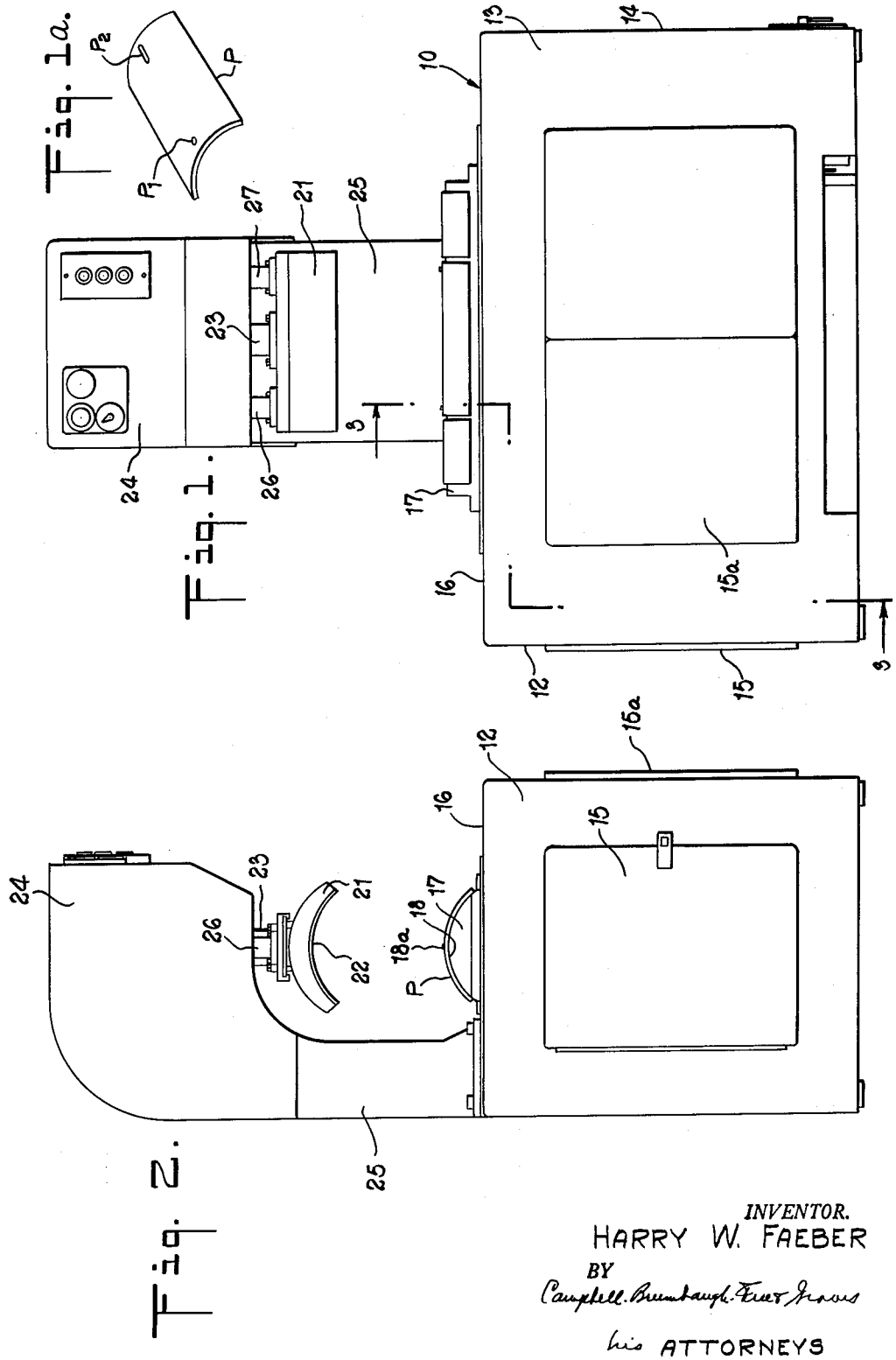

INVENTOR.
HARRY W. FAEBER
BY
Campbell Brumbaugh Free & Graves
his ATTORNEYS

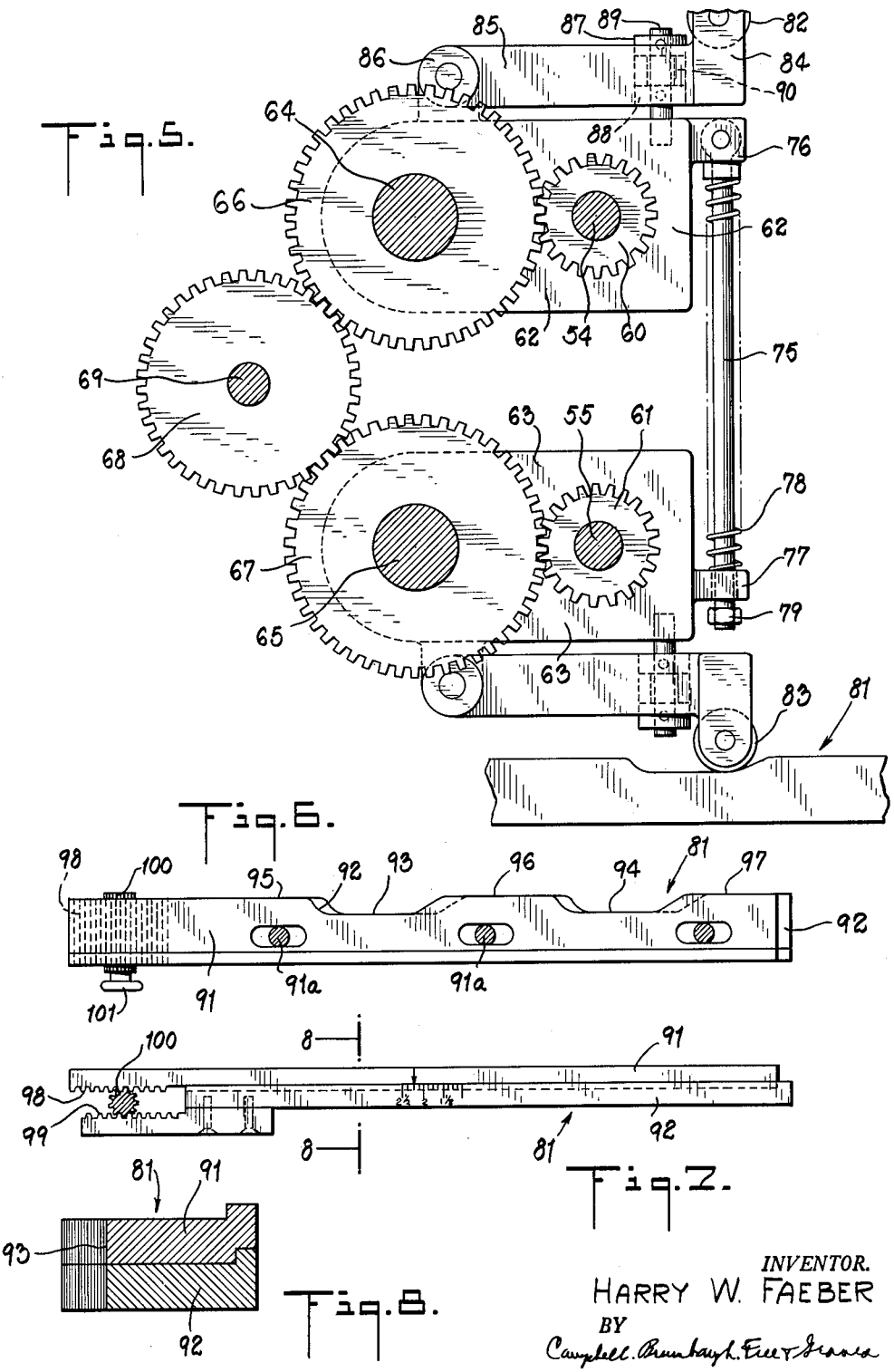

March 6, 1956  H. W. FAEBER  2,736,947
PLATE GROOVING MACHINE
Filed Jan. 23, 1953  6 Sheets-Sheet 5

INVENTOR.
HARRY W. FAEBER
BY
his ATTORNEYS

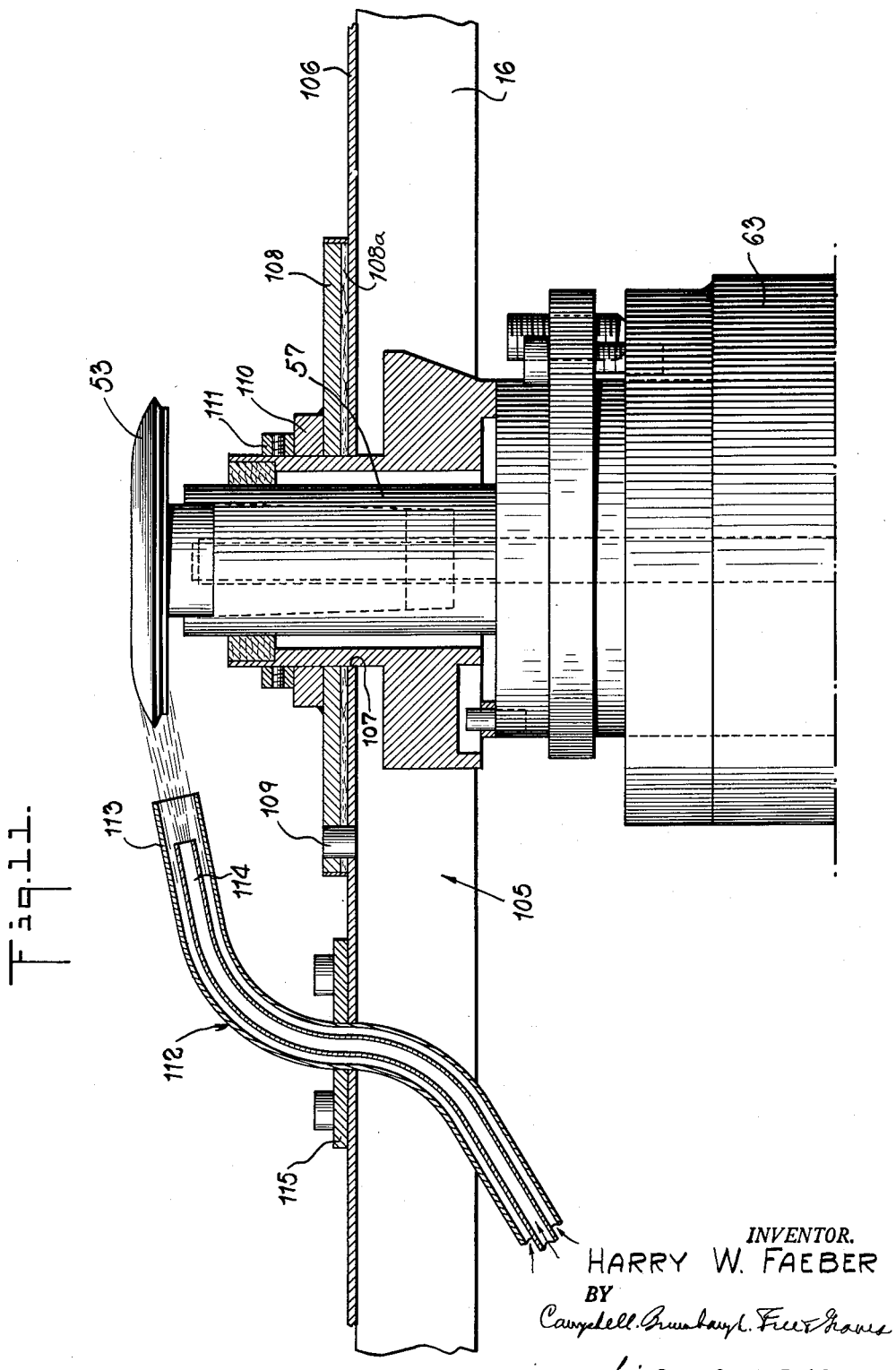

United States Patent Office 2,736,947
Patented Mar. 6, 1956

2,736,947

PLATE GROOVING MACHINE

Harry W. Faeber, Larchmont, N. Y., assignor to Time, Incorporated, New York, N. Y., a corporation of New York Application January 23, 1953, Serial No. 332,911

6 Claims. (Cl. 29—21)

This invention relates to machine tools for cutting or milling recesses in metal plates and it relates more particularly to automatic machines for cutting clamp-receiving recesses in the back of curved printing plates to enable the plates to be mounted on or "locked up" on a plate cylinder of a printing press.

Recently new types of lock-up means have been developed for the plate cylinders of printing presses. These cylinders are provided with clamping hooks adapted to engage in recesses or notches formed in the backs of curved printing plates so as to retain these plates on the plate cylinder, to enable the plates to be adjusted for register and to permit the plates to be brought into edge to edge contact, thereby allowing a greater proportion of the surface area of the plate cylinder to be used in a printing operation. Inasmuch as the recesses or notches in the backs of the printing plates must be located accurately with respect to the subject matter or relief image on the surface of the plates to facilitate the registration of the plates on the several cylinders and inasmuch as the recesses are on the concave side of said plates, considerable difficulty has been encountered in providing a mechanism which is capable of cutting recesses of the proper depth and location in the plates.

The present invention relates to a machine by means of which accurately located recesses of accurately controlled shape and depth can be milled or cut in the back surface of a curved printing plate. More particularly, the machine may include a saddle or other suitable supporting means and a cooperating clamping member for folding a curved or semi-cylindrical printing plate in a fixed predetermined position. The machine may include one or more rotary milling cutters or the like which are suitably mounted with respect to the saddle or support and which can be moved through openings in the saddle into engagement with the back surface of the printing plate. The cutters are mounted on a carriage or similar structure so that they can be moved lengthwise of the edge of the plate so as to cut elongated recesses of a predetermined length and depth in the back surface of the plate. The cutters are also mounted so that they can move outwardly into cutting engagement with the back of the plate and inwardly to retract them out of cutting engagement with the plate as an incident of their movement lengthwise of the plate so that one or more notches or recesses can be cut in the back of each plate, as may be required.

The machine is provided with mechanism by means of which the depth of the recesses, as well as their length and their position with respect to the edges of the plate, can be controlled. Moreover, the machine may be provided with mechanism whereby the chips produced by the cutting or milling operation can be blown away from the milling cutters and out of contact with other operating parts of the machine.

A machine of the type described above, can, by adjustment of the several controls thereof, cut long or short recesses of substantially any desired depth in the back of the printing plate and in substantially any desired relation to the edges of the plate so that a series of printing plates, for example, a set of color printing plates may be provided with clamp receiving recesses in accurate predetermined relation to the printing area of each of the plates.

For a better understanding of the present invention, reference may be had to the accompanying drawings, in which:

Fig. 1 is a view in front elevation of a typical machine embodying the present invention;

Fig. 1a is a perspective view of a curved printing plate;

Fig. 2 is an end view of the machine;

Fig. 5 is a view in section on line 5—5 of Fig. 3, with parts removed to disclose the spindle supporting structure more clearly;

Fig. 6 is a plan view with parts in section and partly broken away showing the control cam for regulating the movement of the cutters of the machine;

Fig. 7 is a view in front elevation of the control cam;

Fig. 8 is a view in section taken on line 8—8 of Fig. 7;

Fig. 11 is a view in section taken on line 11—11 of Fig. 9.

Figure 3:
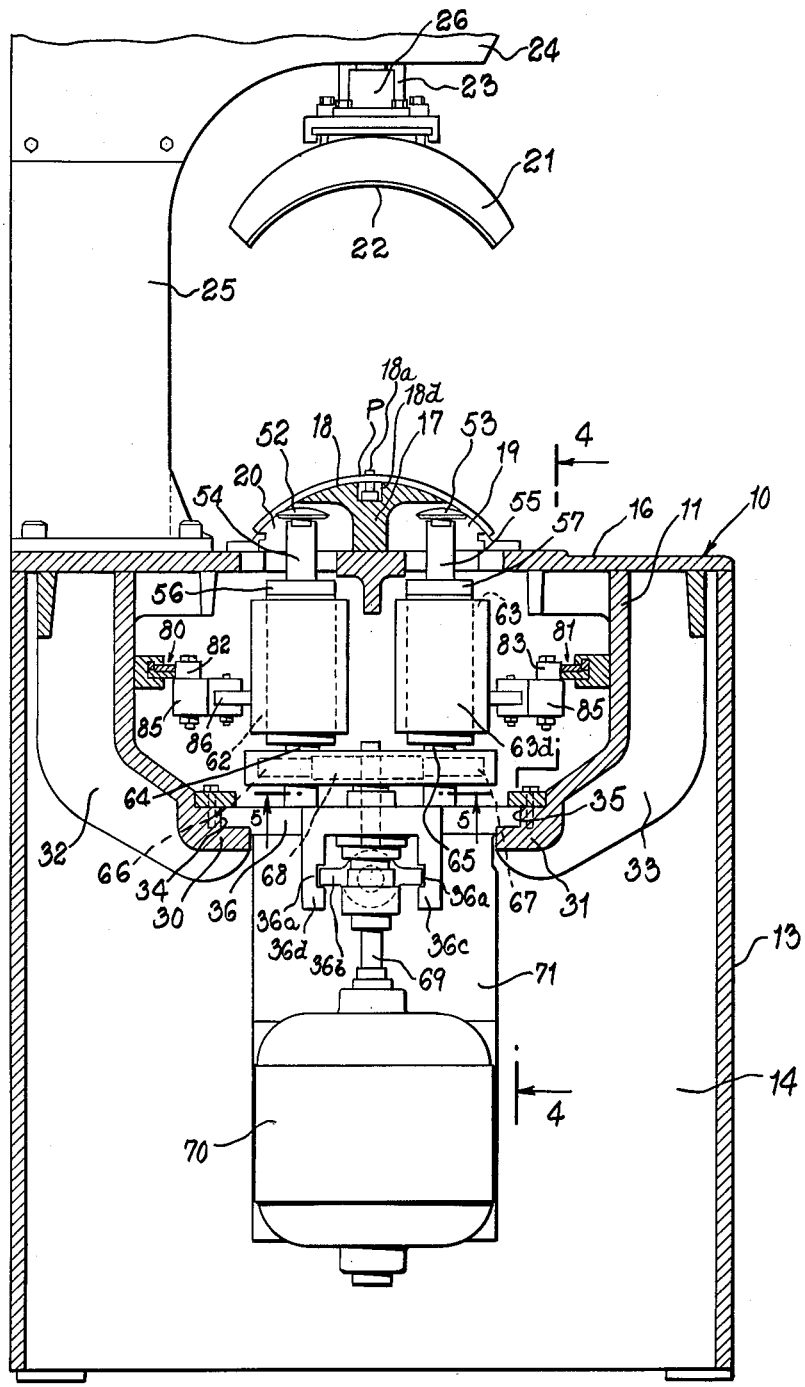
Fig. 3 is a view in section taken on line 3—3 of Fig. 1.

As illustrated in Figs. 1 to 4, inclusive, a typical machine of the type embodying the present invention may include a table member 10 which includes a supporting frame 11 and outside cover panels 12, 13 and 14 for encasing the operating mechanism of the machine. The panels 12 and 13 may be provided with access doors 15 and 15a to gain access to the mechanism for adjusting and cleaning it. The table 10 also includes a substantially flat table top 16 on which is mounted a saddle member 17 having an outer surface 18 forming a portion of the surface of a cylinder. The surface 18 conforms to the curvature of a printing plate P in the back of which recesses are to be cut for engagement by clamping hooks on a plate lock-up cylinder. The saddle 17 is provided with longitudinally extending openings 19 and 20 which extend throughout the major portion of the length of the saddle and which, therefore, expose portions of the back of the plate P between its center line and its opposite straight edges.

Plate P is located on saddle surface 18 by means of register pins 18a and 18b. 18a engages a register hole P1 and 18b a register slot P2 which were punched in the plate in exact relationship to the printing image in a registering process which forms no part of this invention. Register pin 18c is also provided for the purpose of locating double page plates in which case register pin 18a would be removed temporarily. After grooving one-half of such double page plate the plate is turned end for end and the other half is grooved. Register pins 18a, 18b and 18c are carried in bar 18d which is fastened to saddle 17 by screws 18e.

The plate is clamped to the saddle 17 by means of a clamping head 21 having a lower concave face 22 complemental to the outer surface of the plate P. The clamping head 21 is rigid and may be lowered against the plate or retracted therefrom in any suitable way. As illustrated, the clamping head is supported on the piston 23 of an hydraulic ram, not shown, which is mounted in a head enclosure 24 supported on the outer end of a standard 25 extending upwardly from about the middle of the back of the table top 16. The clamping head 21 is constrained against rotation by means of guide rods 26 and 27 which are received in guide sleeves, not shown, in the head enclosure 24. While an hydraulic jack system is preferred for raising and lowering the head 21, it will be understood that it can be lowered or raised by means of a screw or the like, as desired.

Figure 4:
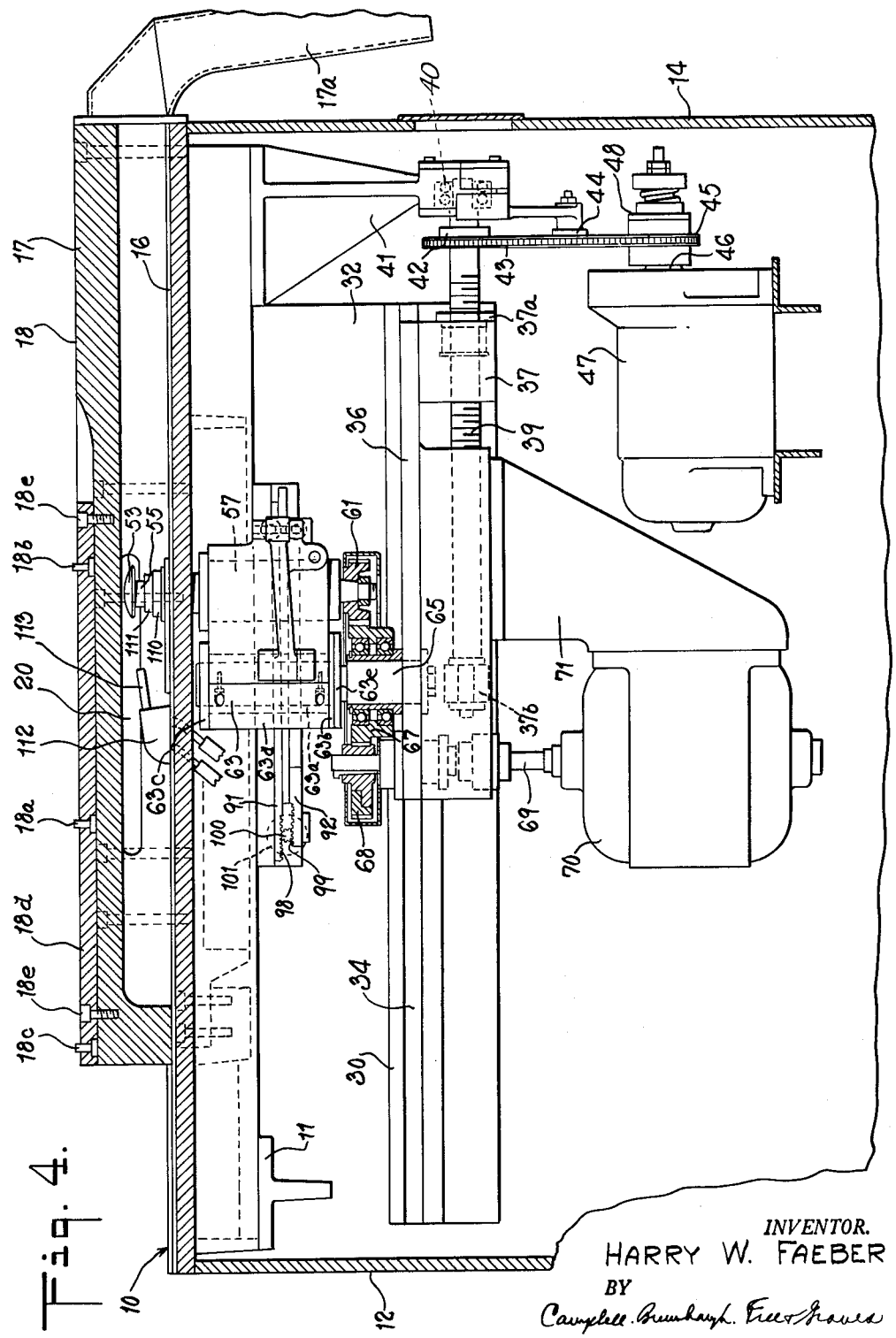
Fig. 4 is a view in section taken on line 4—4 of Fig. 3.

Referring now to Figs. 3 and 4, the frame 11 of the machine includes a pair of spaced apart guideways 30 and 31 which are supported by means of heavy arms 32 and 33 extending down from the sides of the table top plate 16. The guideways 30 and 31 have longitudinally extending grooves 34 and 35 therein for receiving the side edges of a carriage plate 36 to permit the plate 36 to slide endwise along the guideways. The carriage plate is provided with a downwardly extending lug 37 at its end which is internally threaded to receive the externally threaded lead screw 39 which is rotatably supported at its outer end in a bearing 40 mounted in a downwardly extending bracket 41 at the right-hand end of the table 16. Flanged nut 37a serves to adjust the thread clearance between the lug 37 and lead screw 39. The left side end of lead screw 39 is supported in crosshead 37b which slides in grooves 36a and 36b cut in the downward projections 36c and 36d of carriage 36. Rotation of the shaft 39 will screw it into or out of the lug 37 thereby causing movement of the carriage plate 36 along the guides. The shaft 39 may be driven by means of a sprocket 42 adjacent its outer end and a chain 43 which passes around the sprocket 42, over an idler sprocket 44 and a sprocket 45 mounted on the drive shaft 46 of an electric motor 47 mounted adjacent the base of the machine. The sprocket is coupled to the drive shaft 46 by means of a spring-biased friction clutch 48 of conventional type which is keyed to the drive shaft 46.

The carriage plate 36 supports the milling cutters and the motor for driving them as described hereinafter. As shown in Figs. 3, 4 and 5, the milling cutters 52 and 53 are mounted on the upper ends of drive spindles 54 and 55 of a conventional type. Each spindle includes a bushing 56 or 57 for supporting the spindle. Each spindle has a chuck on its upper end to receive a milling cutter 52 or 53. The drive spindles 54 and 55 are provided with gears 60 and 61 at their lower ends by means of which the spindles are driven. As shown in Fig. 4, the bushings 56 and 57 are mounted in heavy blocks 62 and 63. The guide blocks 62 and 63 are supported for oscillation around the shafts 64 and 65, respectively, which are rigid with and extend upwardly from the carriage plate 36 in spaced parallel relation. Directly above the carriage plate 36 are idler gears 66 and 67 mounted for rotation on the shafts 64 and 65. The idler gears 66 and 67 mesh with the pinions 60, 61, respectively. Inasmuch as the blocks 62 and 63 are supported on the shafts 64 and 65 on which the idler gears 66 and 67 are also mounted, oscillatory movement of the guide blocks 62 and 63 will not alter the mesh between the idler gears and the drive pinions 60, 61. Both of the idler gears 66 and 67 mesh with a gear 68 which is mounted on the upper end of the drive shaft 69 of an electric motor 70. The electric motor is supported on a bracket 71 which extends downwardly from the undersurface of the carriage plate 36, so that the motor moves with the carriage and maintains the desired drive relation between the motor and the cutter spindles 54 and 55.

Referring to Figure 5, the two spindle supporting blocks are disclosed as tied together with capacity for relative movement by means of a tie rod 75 which is connected to a lug 76 on the block 62 and has its opposite end extending through a lug 77 on the other supporting block 63. Blocks 62 and 63 are normally urged apart by means of a spring 78 which is mounted on the tie rod 75 and bears against the lug 76 and the lug 77. The end of the tie rod 75 is threaded to receive a nut 79 by means of which the ends of the blocks and the cutters 52 and 53 carried thereby can be drawn together, away from their working position.

As shown in Fig. 4, the support block 63 is pivoted on a sleeve 63a which has lower flange 63b and upper flange 63c. To allow assembly of block 63 on sleeve 63a the block is provided with a detachable cap 63d. The shaft 65 is in threaded engagement with sleeve 63a so that by turning the sleeve 63a the support block 63 and thus cutter 53 may be raised or lowered. Locknut 63e is used to lock this adjustment. Support block 62 is provided with similar adjustable mounting.

Movement of the cuters 52 and 53 toward and away from the undersurface of the plate P is controlled by means of cam bars 80 and 81 mounted on the frame 11 on opposite sides of the supporting blocks 62 and 63 as shown in Figs. 3 and 4. The cam bars 80 and 81 are engaged by follower rollers 82 and 83 which are connected to the corresponding blocks 62 and 63. The roller 82, for example, is rotatably mounted on a horizontal extension 84 of an arm or lever 85 which extends generally parallel with the side of the block 62 and is pivotally connected at one end by means of a pivot to a lug 86 extending from the outer edge of the block 62. The arm 85 is provided with a lug 90 through which extends a bolt 89 having its inner end fastened to the block 62. Nuts 87 and 88 are mounted on either side of the lug 90 and are adjustable along the bolt 89 to adjust the arm 85 toward or away from the side of the spindle carrying block 62.

As indicated, shown in Figures 6 and 7, the cam bars 80 and 81 are similar and are made up of two elongated generally flat bars 91 and 92 which are relatively adjustable. The cam bar 81, for example, includes an upper bar 91 and a lower 92 which are provided with similar valleys 93 and 94 and hills 95, 96 and 97 alternating the valleys. The cam bars 91 and 92 are movable relative to each other to move the hills and valleys thereof, into or out of alignment with each other. The hills on bar 91 can be adjusted, as shown in Fig. 6 to overlap the valleys of the bar 92 to thereby reduce the effective lengths of the valleys. Inasmuch as the length of the valleys in the adjusted cam bars 80 and 81 controls the length of the recesses to be cut in the back of the printing plate P, it will be understood that the valleys be made of greater or lesser length by suitable adjustment of the bars 91 and 92 relative to each other. The bars 91 and 92 are adjusted relative to each other by providing their opposite ends with racks 98 and 99 which engage the opposite sides of a pinion 100 rotatably mounted on the frame 11. A knob or hand wheel 101 is mounted on the pinion 100 to adjust the bars 91 and 92 relative to each other. Tightening the bolts 91a will lock this adjustment.

As explained generally above, the cam bars 80 and 81 regulate the inward and outward movement of the cutter spindle supporting blocks 62 and 63 and likewise the inward and outward movement of the cutters 52 and 53. In this way, movement of the carriage along the guideways 30 and 31 produces transverse movement of the cutters 52 and 53 to cut away the metal in the back of the plate P at spaced zones along its back.

Figure 9:
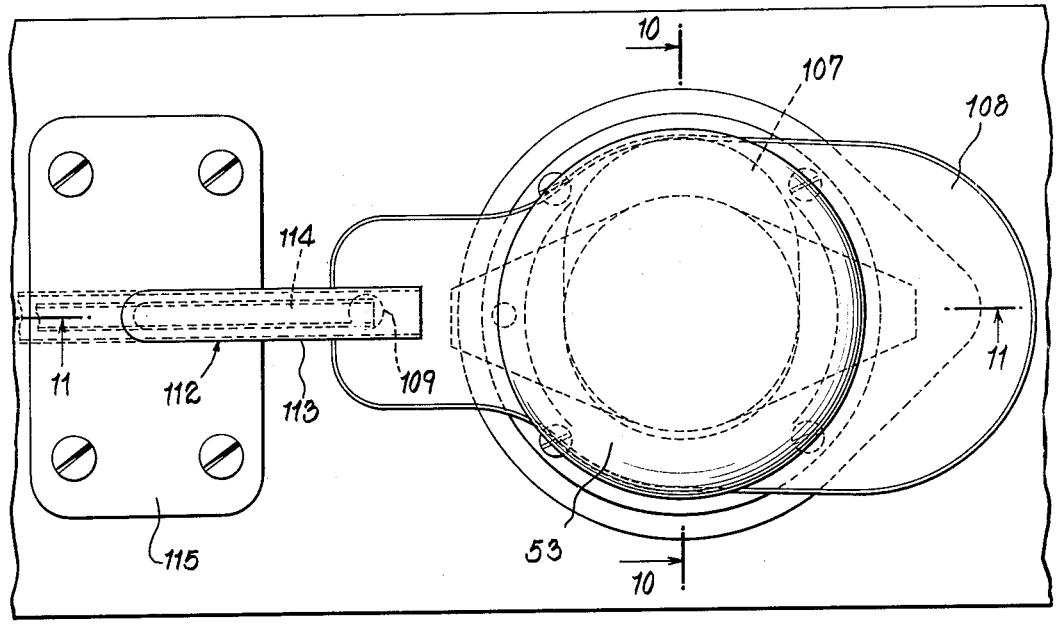
Fig. 9 is a plan view of a detail of the slide through which one cutter extends and disclosing a nozzle for introducing air under pressure and cooling fluid against the milling cutter.
Figure 10:
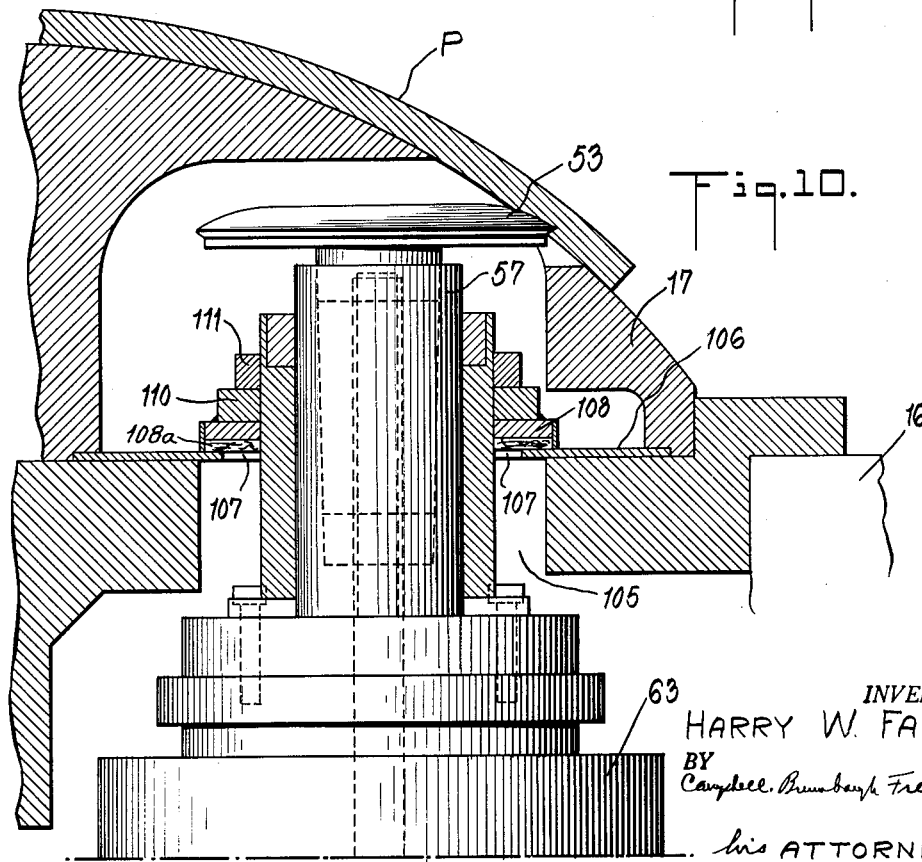
Fig. 10 is a view in section taken on line 10—10 of Fig. 9 and disclosing also in section a portion of the supporting saddle and the printing plate carried thereby.

Inasmuch as the cutters must be provided with a coolant, and the coolant and metal chips must be diverted away from the operating part of the machine for maximum efficiency, suitable cooling and protecting means are provided in the machine. As shown in Figures 9, 10 and 11, the upper ends of the spindles 56 and 57 extend upwardly through slots 105 extending lengthwise of the table top 16 with sufficient clearance therein to permit the cutters 52 and 53, for example, to move into and out of engagement with the printing plate P. To cover the slots 105 and prevent coolant from leaking down through the slots a plate 106 is slidably mounted between the top of the table 16 and the undersurface of the edges of the saddle 17 for movement lengthwise of the table to cover each slot 105. The plate 106 covers a major portion of the opening 105 but an opening 107 must be left in the plate 106 to enable the spindle 57, for example, to move laterally relative to the plate 106. The opening 107 may be closed by means of a cover plate 108 fitting tightly about the spindle 57 and having a gasket 108a on its lower surface which bears against the upper surface of the plate 106 and sealing the opening 107. The cover plate 108 is held in position on the slide plate 106 by means of a pivot pin 109 which engages one end of the cover plate. As shown in Figure 9, the cover plate 108 is generally paddle shaped having a wider portion at one end which at all times covers the opening 107. The cover plate is held in position on the spindle 57 by means of locking rings 110 and 111 which bear against the outer surface of the plate 108.

Fluid for cooling the cutters 52 and 53 may be introduced through a nozzle 112 consisting of an outer tube 113 and an inner tube 114 which are supported generally coaxially in a bracket carried by the slide plate 106. The outer tube 113 is connected to a source of cooling gas while the inner tube 114 is connected to a source of cooling liquid. The gas and liquid are directed against the cutters to cool them and blow away the metal chips removed by the cutters. The liquid and chips are discharged at the end of the saddle 17 and, through chute 17a (Fig. 4), and may be returned to a sump for removal of the chips and reuse of the coolant liquid.

The head enclosure 24 may be provided with a suitable control panel containing starting and stopping switches for the motors 47 and 70 and may also be provided with control valves or switches for controlling the up and down movement of the clamping head 22. If desired, suitable pressure gauges and the like may also be mounted in the head for easy observation.

In a typical operation of the machine, a printing plate P is placed on top of the saddle 17 in the position desired. The register pins 18a, 18b, 18c and the corresponding openings provided in the plate accurately position the plate with respect to the saddle as described above. The clamping head 21 is then lowered to clamp the plate P firmly to the saddle.

With the carriage plate 36 and cutters supported thereon at the left-hand end of the machine as viewed in Fig. 4, the motor 70 is started to set the cutters 52 and 53 into rotation. In this position, the follower rollers 82 and 83 are on the hills of the cams 80 and 81 so that the cutters 52 and 53 are out of engagement with the back surface of the plate P.

The motor 47 is then set into operation and the carriage plate 36 is moved slowly to the right. As the followers 82 and 83 run off of the hills into the valleys 93 of the cams, the spring 78 forces the spindle supporting blocks 62 and 63 outwardly thereby bringing the cutters into cutting engagement with the back of the plate. As the movement of the carriage plate 36 continues, the followers 82 and 83 move up on to the hills 96 of the cams thereby moving the cutters away from the plate. Continued movement will bring the followers 82 and 83 into the valleys 94 of the cams thereby causing the cutters to again move into cutting relation to the back of the plate. At the end of the cutting operation, the cutters are again retracted by the hills 97 on the cams 80 and 81 and at that time the motors 47 and 70 may be stopped and the plate P released by retracting the clamping head 21. The motor 47 can be reversed to move the carriage back to the left for another cutting operation or, if desired, another plate can be placed on the saddle and clamped in position. The motor 47 is reversed and recesses are cut in the back of the plate during the return movement of the carriage to its starting position.

It will be noted that the machine can be manually controlled as described above or it can be provided with automatic controls of conventional type which operate sequentially to clamp a plate in position and start the motors 47 and 70 to accomplish the milling operation and then start the motors or to return the carriage to the starting position and then stop the motors.

It will be understood that the machine may be provided with various types of cutters for milling recesses of desired shapes in the plate and that the control cams can be modified to vary the number and spacing of the recesses in the back of a plate.

Other modifications and variations may be made in the machine such as in the specific type of drive mechanism interposed between the milling cutters and the drive motor therein. For example a multiple belt drive may be substituted for the gear drive described herein. Also, the motor for driving the carriage may be mounted on the carriage and movable therewith. Other conventional details such as the use of limit switches to control the movement of the carriage and different forms of nozzles for supplying coolant and the like may be used, if desired. Accordingly, the form of the invention disclosed herein should be considered as illustrative of the invention and not as limiting the scope of the following claims.

I claim:

1. An apparatus for cutting clamp-receiving recesses in the back of a printing plate comprising a frame, a saddle mounted on said frame and having a convexly curved semi-cylindrical outer surface to receive a printing plate, means on said frame to clamp said printing plate against the outer surface of said saddle, said saddle having at least one opening therethrough exposing a portion of the back of said plate adjacent a longitudinal edge thereof, a carriage mounted on said frame behind said saddle for movement lengthwise of said saddle in a plane substantially parallel with the edges of said plate, a power driven rotary cutting tool mounted on said carriage, pivot means on said carriage having a pivot axis substantially perpendicular to said plane, said pivot means supporting said cutting tool for movement around said pivot axis with the cutter axis substantially parallel with said pivot axis, said cutting tool being movable into and out of cutting relation to said printing plate in a plane substantially parallel with the plane of movement of said carriage, means to move said carriage lengthwise of said saddle, and means to move said cutting tool into and out of cutting relation to said plate.

2. An apparatus for cutting clamp-receiving recesses in the back of a printing plate comprising a frame, a saddle mounted on said frame and having a convexly curved outer surface to receive a printing plate, means on said frame to clamp said printing plate against the outer surface of said saddle, said saddle having at least one opening therethrough exposing a portion of the back of said plate adjacent a longitudinal edge thereof, a carriage mounted on said frame behind said saddle for movement lengthwise of said saddle in a plane substantially parallel with the edges of said plate, a power driven cutting tool mounted on said carriage, means on said carriage supporting said tool for pivoting movement about an axis substantially perpendicular to the plane of movement of said carriage and maintaining the axis of said tool substantially perpendicular to said plane during said movement, said cutting tool being movable into and out of cutting relation to said printing plate, means to move said carriage lengthwise of said saddle, a cam member extending lengthwise of said saddle and mounted on said frame, and a cam follower on said cutting tool engaging said cam member to move said cutting tool into and out of cutting relation to said printing plate.

3. An apparatus for cutting clamp-receiving recesses in the back of a printing plate comprising a frame, a saddle on said frame having a convexly curved outer surface to support a printing plate with portions of its back exposed between its longitudinal center and its side edges, a carriage mounted in said frame behind said saddle for movement lengthwise of said frame and in a plane substantially parallel to the side edges of said plate, means to move said carriage lengthwise of said frame, a motor on said carriage having a drive shaft substantially perpendicular to the plane of movement of said carriage, a pair of pivot shafts mounted on said carriage substantially perpendicular to said plane, a pair of cutter supporting shafts spaced from said motor and substantially parallel with said motor shaft, supporting blocks mounting said cutter supporting shafts for rotation, said supporting blocks being pivotally mounted on said pivot shafts and supporting said cutter supporting shafts in substantially parallel relation to said pivot shafts for relative movement substantially transversely of the direction of movement of said carriage, means connecting said cutter supporting shafts to said drive shaft for rotation thereby, and means to move said cutter supporting shafts substantially transversely of said carriage around said pivot shafts to move the cutters thereon into and out of cutting relation with the exposed back portions of said plate adjacent opposite side edges thereof.

4. An apparatus for cutting clamp-receiving recesses in the back of a printing plate comprising a frame, a saddle on said frame having a convexly curved outer surface to support a printing plate with portions of its back exposed between its longitudinal center and its side edges, a carriage mounted in said frame behind said saddle for movement lengthwise of said frame and in a plane substantially parallel to the side edges of said plate, means to move said carriage lengthwise of said frame, a motor on said carriage having a drive shaft substantially perpendicular to the plane of movement of said carriage, a pair of parallel shafts fixed to said carriage substantially parallel with said drive shaft, a pair of cutter supporting spindles, a drive gear on said drive shaft, an idler gear on each of said parallel shafts and meshing with said drive gear, a driving gear on each spindle meshing with a corresponding idler gear, means supporting said spindles for rotation and relative oscillatory movement about the axis of a corresponding idler gear and substantially transversely of said carriage in a plane parallel with the plane of movement of the carriage, cam means on said frame on opposite sides of said carriage extending substantially parallel with the direction of movement of said carriage, and a cam follower on each of said means supporting said spindles, each cam follower engaging one of said cam means to move the cutters into and out of cutting relation to said printing plate in response to movement of said carriage lengthwise of said frame.

5. The apparatus set forth in claim 4 comprising means to adjust said cam means relative to said followers to vary the transverse movement of the supporting means for said spindles, and means to urge said cam followers into contact with said cam means.

6. The apparatus set forth in claim 4 in which said each of the cam means comprises a pair of superimposed relatively movable elongated cam plates mounted on said frame adjacent to said carriage, each of said cam plates having similar alternating hills and valleys, and means to adjust said cam plates lengthwise relative to each other to a position in which said hills and valleys on said plates coincide and to other positions in which the hills on one of said cam plates overlap the valleys on the adjacent cam plate.

References Cited in the file of this patent

UNITED STATES PATENTS

| | | |
|---|---|---|
| 2,480,102 | Weisglass | Aug. 30, 1949 |
| 2,531,647 | Roesen et al. | Nov. 28, 1950 |
| 2,604,017 | Crafts et al. | July 22, 1952 |
| 2,614,463 | Barkstrom | Oct. 21, 1952 |
| 2,670,662 | Ricards et al. | Mar. 2, 1954 |

FOREIGN PATENTS

| | | |
|---|---|---|
| 403,070 | France | Oct. 25, 1909 |